US009595733B2

United States Patent
Valencia, Jr. et al.

(10) Patent No.: US 9,595,733 B2
(45) Date of Patent: Mar. 14, 2017

(54) BATTERY MODULES AND ASSEMBLIES

(75) Inventors: Pablo Valencia, Jr., Northville, MI (US); Kanthasamy Elankumaran, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1608 days.

(21) Appl. No.: 12/907,641

(22) Filed: Oct. 19, 2010

(65) Prior Publication Data

US 2012/0094165 A1    Apr. 19, 2012

(51) Int. Cl.
| | | |
|---|---|---|
| *H01M 10/50* | (2006.01) | |
| *H01M 10/0525* | (2010.01) | |
| *H01M 10/34* | (2006.01) | |
| *H01M 10/625* | (2014.01) | |
| *H01M 10/615* | (2014.01) | |
| *H01M 10/647* | (2014.01) | |
| *H01M 10/6551* | (2014.01) | |

(Continued)

(52) U.S. Cl.
CPC ..... *H01M 10/0525* (2013.01); *H01M 10/345* (2013.01); *H01M 10/615* (2015.04); *H01M 10/625* (2015.04); *H01M 10/647* (2015.04); *H01M 10/6551* (2015.04); *H01M 10/6555* (2015.04); *H01M 10/6557* (2015.04); *Y02E 60/122* (2013.01); *Y02E 60/124* (2013.01)

(58) Field of Classification Search
CPC ............ H01M 10/50; H01M 10/5004; H01M 10/5008; H01M 10/501; H01M 10/5032; H01M 10/504; H01M 10/5048; H01M 10/5075; H01M 10/5077; H01M 10/0525; H01M 10/6555; H01M 10/615; H01M 10/647; H01M 10/6551; H01M 10/6557; H01M 10/625; H01M 10/345; Y02E 60/122; Y02E 60/124
USPC ......................................................... 429/120
See application file for complete search history.

(56) References Cited

U.S. PATENT DOCUMENTS

| | | | | |
|---|---|---|---|---|
| 2002/0086780 | A1* | 7/2002 | Morris ........................... | 482/136 |
| 2004/0086780 | A1* | 5/2004 | Ebermann ..................... | 429/120 |
| 2004/0194489 | A1* | 10/2004 | Pode ............................. | 62/259.2 |

(Continued)

FOREIGN PATENT DOCUMENTS

| | | | |
|---|---|---|---|
| CN | 101828299 A | 9/2010 | |
| DE | 10 2009 014 954 | * 10/2009 | ............ H01M 10/50 |

(Continued)

OTHER PUBLICATIONS

Machine English Translation of JP 08-321329 to Okajima et al.*

(Continued)

*Primary Examiner* — Milton I Cano
*Assistant Examiner* — Michael Dignan
(74) *Attorney, Agent, or Firm* — Lorenz & Kopf, LLP

(57) ABSTRACT

A battery module is provided. The battery module includes a first battery cell; a heat transfer plate contacting the first battery cell and defining a perimeter, the heat transfer plate having a first thickness; a heat transfer fin extending from the perimeter of the heat transfer plate, the heat transfer fin having a second thickness that is greater than the first thickness; and a fluid conduit coupled to the heat transfer fin, whereby, during operation, heat is transferred from the first battery cell, to the heat transfer layer, to the heat transfer fin, and to the fluid conduit.

20 Claims, 5 Drawing Sheets

(51) Int. Cl.
H01M 10/6557 (2014.01)
H01M 10/6555 (2014.01)

(56) References Cited

U.S. PATENT DOCUMENTS

2005/0074666 A1* 4/2005 Kimiya et al. .................. 429/62
2008/0292948 A1* 11/2008 Kumar et al. ................. 429/120
2010/0257883 A1 10/2010 Damsohn et al.
2011/0189523 A1* 8/2011 Eom ............................ 429/120
2012/0171543 A1* 7/2012 Hirsch et al. ................. 429/120

FOREIGN PATENT DOCUMENTS

| JP | 08-321329 | * 12/1996 | ........... H01M 10/50 |
| WO | 2010112386 A2 | 10/2010 | |

OTHER PUBLICATIONS

State Intellectual Property Office of the People's Republic of China, Office Action for Chinese Patent Application No. 201110318202.7, mailed Dec. 19, 2013.
State Intellectual Property Office of the People's Republic of China, Office Action in Chinese Patent Application No. 201110318202.7, mailed Mar. 10, 2015.

* cited by examiner

BATTERY MODULES AND ASSEMBLIES

TECHNICAL FIELD

The inventive subject matter generally relates to batteries, and more particularly relates to battery assemblies with battery modules having improved cooling characteristics for use in automobiles.

BACKGROUND

Electrical systems within automobiles, particularly alternative fuel vehicles, such as hybrid, electric, and fuel cell vehicles have advanced in complexity and power usage. Such alternative fuel vehicles typically use an electric motor, in combination with a battery, to drive the wheels of the vehicle.

Alternative fuel vehicles typically use high power output and large capacity batteries as the power source, e.g., a nickel-metal hydride (Ni-MH) battery. In recent years, however, the use of a lithium-ion battery has been attempted. Generally, a number of small-sized lithium-ion unit battery cells are connected in series or parallel with each other so as to construct a larger battery assembly. The battery cells may be prismatic batteries or pouch-shaped batteries that are stacked one on another to reduce dead space within the battery assembly, and thus, the overall size. The battery cells are packaged together with mechanical and electrical couplings between the battery cells to form a battery module, which may be coupled with additional modules to form a battery assembly.

Heat may be generated by the battery cells during the charge and discharge processes of the battery assembly. This heat should be effectively addressed since heat that accumulates in the battery assembly may adversely affect the battery cells. Consequently, it is desirable to provide a cooling system to maintain an appropriate temperature. Conventionally, cooling systems may utilize cooling air blown over the cells. Liquid cooling may also be used. These conventional cooling systems, however, may have high manufacturing and maintenance costs.

Accordingly, it is desirable to provide battery assemblies with improved temperature regulation. Furthermore, other desirable features and characteristics of the present invention will become apparent from the subsequent description taken in conjunction with the accompanying drawings and the foregoing technical field and background.

BRIEF SUMMARY

In accordance with an exemplary embodiment, a battery module is provided. The battery module includes a first battery cell; a heat transfer plate contacting the first battery cell and defining a perimeter, the heat transfer plate having a first thickness; a heat transfer fin extending from the perimeter of the heat transfer plate, the heat transfer fin having a second thickness that is greater than the first thickness; and a fluid conduit coupled to the heat transfer fin, whereby, during operation, heat is transferred from the first battery cell, to the heat transfer layer, to the heat transfer fin, and to the fluid conduit.

In accordance with another exemplary embodiment, a battery module is provided. The battery module includes a plurality of stacked battery cells; a plurality of heat transfer plates, each interposed between adjacent battery cells of the plurality of stacked battery cells and defined by at least a first side, each of the plurality of heat transfer plates has a first thickness; a plurality of heat transfer fins, each extending from the perimeter of one of the plurality of heat transfer plates, each of the plurality of heat transfer fins having a second thickness greater than the first thickness; and a heat sink coupled to each of the plurality of heat transfer fins.

DESCRIPTION OF THE DRAWINGS

The inventive subject matter will hereinafter be described in conjunction with the following drawing figures, wherein like numerals denote like elements, and wherein.

DETAILED DESCRIPTION

The following detailed description is merely exemplary in nature and is not intended to limit the inventive subject matter or the application and uses of the inventive subject matter. Furthermore, there is no intention to be bound by any expressed or implied theory presented in the preceding technical field, background, brief summary or the following detailed description.

FIGS. 1 to 6 illustrate automobile and battery assemblies according to exemplary embodiments. Generally, the battery assemblies include one or more battery modules coupled together. Each battery module may include unit battery cells stacked together with heat transfer plates extending between the unit battery cells. To remove heat from the battery unit cells, the heat transfer plates are coupled to a fluid conduit with heat transfer fins. The heat transfer fins may have thicknesses greater than the heat transfer plates to improve heat transfer characteristics.

Figure 1:
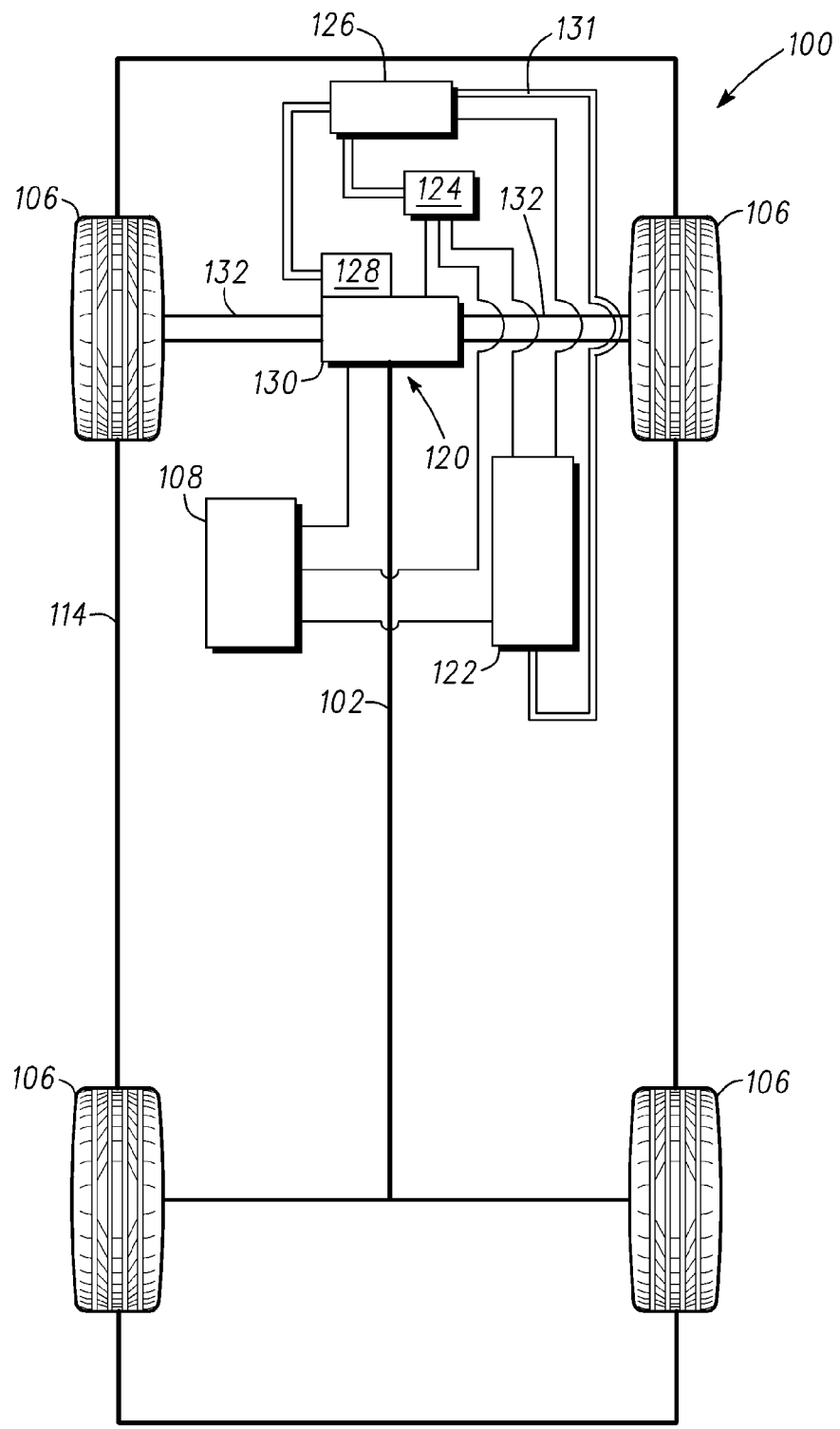
FIG. 1 is a schematic view of an automobile according to an exemplary embodiment.

FIG. 1 is a schematic view of an automobile 100 (or vehicle), according to an exemplary embodiment. In this embodiment, the automobile 100 includes a chassis 102, a body 114, four wheels 106, and an electronic control system 108. The body 104 is arranged on the chassis 102 and substantially encloses other components of the automobile 100. The body 104 and the chassis 102 may jointly form a frame. The wheels 106 are each rotationally coupled to the chassis 102 near a respective corner of the body 104.

The automobile 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 100 may be a two, three, four, or more wheeled vehicle. The automobile 100 may also incorporate any one of, or combination of, a number of different types of engines, such as, for example, a gasoline or diesel fueled combustion engine, a flex fuel vehicle (FFV) engine (i.e., an engine that uses a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

According to an embodiment, the automobile 100 is a hybrid electric vehicle, and further includes an actuator assembly 120, a battery assembly 122, an inverter 124, and a heat exchanger 126. The actuator assembly 120, the battery assembly 122, and the inverter 124 are in operable communication with the electronic control system 108. The electronic control system 108 may include various sensors and automotive control modules, or electronic control units (ECUs), such as an inverter control module and a vehicle controller.

The actuator assembly 120 includes a combustion engine 128 and an electric motor (or generator) 130. The combustion engine 128 and/or the electric motor 130 may be integrated such that one or both are mechanically coupled to at least some of the wheels 106 through one or more drive shafts 132. In one embodiment, the automobile 100 is a series hybrid electric vehicle, in which the combustion engine 128 is not directly coupled to the transmission, but coupled to a generator (not shown), which is used to power the electric motor 130. In another embodiment, the automobile 100 is a parallel hybrid electric vehicle, in which the combustion engine 128 is directly coupled to the transmission by, for example, having a rotor of the electric motor 130 rotationally coupled to the drive shaft 132 of the combustion engine 128. Although not shown in detail, the electric motor 130, in one embodiment, includes a stator assembly (including conductive coils or windings) and a rotor assembly (including a ferromagnetic core and/or magnets), as well as a transmission.

The battery assembly 122 may be configured to supply high voltage direct current (DC) power to the inverter 124, which may include a three-phase circuit coupled to the motor 130 to convert the DC power to alternating current (AC) power. Generally, one or more battery assemblies 122 may be distributed within the automobile 100. The battery assembly 122 is discussed in greater detail below.

The heat exchanger (e.g., a radiator and/or coolant sump) 126 is connected to the frame at an outer portion thereof and although not illustrated in detail, includes multiple cooling channels therein that contain a working fluid such as water and/or ethylene glycol and is coupled to the actuator assembly 120, the battery assembly 122, and the inverter 124 through a fluid circuit (or coolant path) 131. In general, the working fluid can be any liquid that absorbs or transfers heat to cool or heat an associated component. The term coolant is used herein to refer to the working fluid, although it should be noted that the coolant may heat or cool various components within the automobile 100, including the battery assembly 122. As such, the automobile 100 may further include a heater (not shown) that is incorporated into the fluid circuit 131 to provide a heated working fluid to the battery assembly 122.

According to one exemplary embodiment, the inverter 124 receives and shares coolant with the electric motor 130 and the battery assembly 122. However, other embodiments may use separate coolants for the battery assembly 122, the inverter 124, and/or the electric motor 130. In further embodiments, the heat exchanger 126 is integrated with the battery assembly 122.

Figure 2:
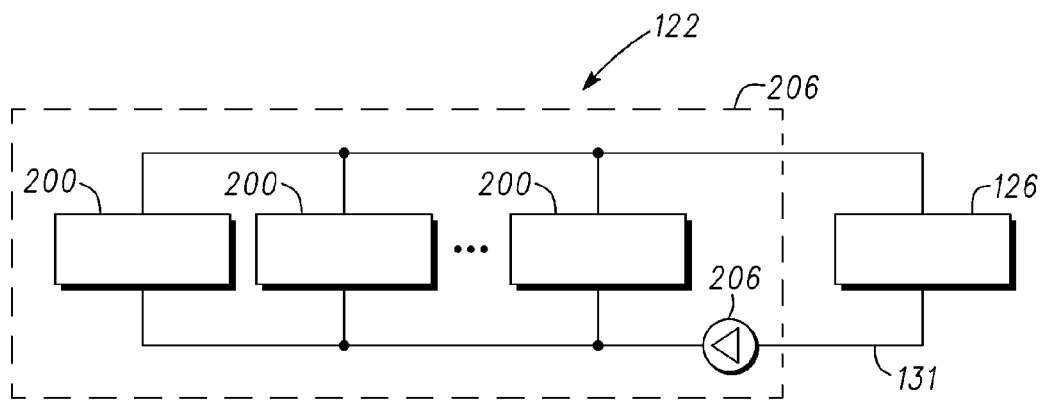
FIG. 2 is an schematic view of a battery assembly of the automobile in FIG. 1 according to an exemplary embodiment.

FIG. 2 is a more detailed, schematic view of the battery assembly 122. The battery assembly 122 made up of a number of battery modules 200. The battery modules 200 are connected in series or parallel to collectively provide voltage to the inverter 124 (FIG. 1) and drive the electric motor 130 (FIG. 1), as described above.

As also noted above, the battery assembly 122 is cooled by a coolant that flows through the fluid circuit 131. The fluid circuit 131 includes a heat exchanger, such as heat exchanger 126, that removes heat from the coolant. In the embodiment discussed above, the heat exchanger 126 may be the radiator or coolant sump of the automobile 100 (FIG. 1). However, in other embodiments, the heat exchanger 126 may be incorporated into the battery assembly 122. For example, the heat exchanger 126 may be a cooling fan that directs cooling air into the battery assembly 122 and across the coolant. In a further embodiment, the heat exchanger may be a solid thermocouple, such as a peltier element. Although not shown in FIG. 2, the fluid circuit 131 may additionally include the actuator assembly 120 (FIG. 1) and the inverter 124 (FIG. 1), or the fluid circuit 131 may be a separate circuit.

Generally, coolant flows into inlets of battery assembly 122 and through the interior of the battery assembly 122 to remove heat from the battery modules 200. The coolant then flows through outlets the battery assembly 122 and through the heat exchanger 126 to discharge the heat. The coolant may then repeat the fluid circuit 131. A pump 206 may facilitate the movement of the coolant through the fluid circuit 131. Additionally, the fluid circuit 131 may include various temperature sensors and control circuits for regulating the temperature of the battery assembly 122.

As shown in FIG. 2, the battery assembly 122 may also have an outer casing 206. The outer casing 206 may be formed by a woven plastic, molded plastic, foam, rubber, metal, or other material. In one exemplary embodiment, the outer casing 206 is molded to the interior components of the battery assembly 122 to have a structure sufficiently rigid to retain the components in a desired position. Although not shown, the battery assembly 122 may include fastener flanges and/or mounting brackets to facilitate installation.

Figure 3:
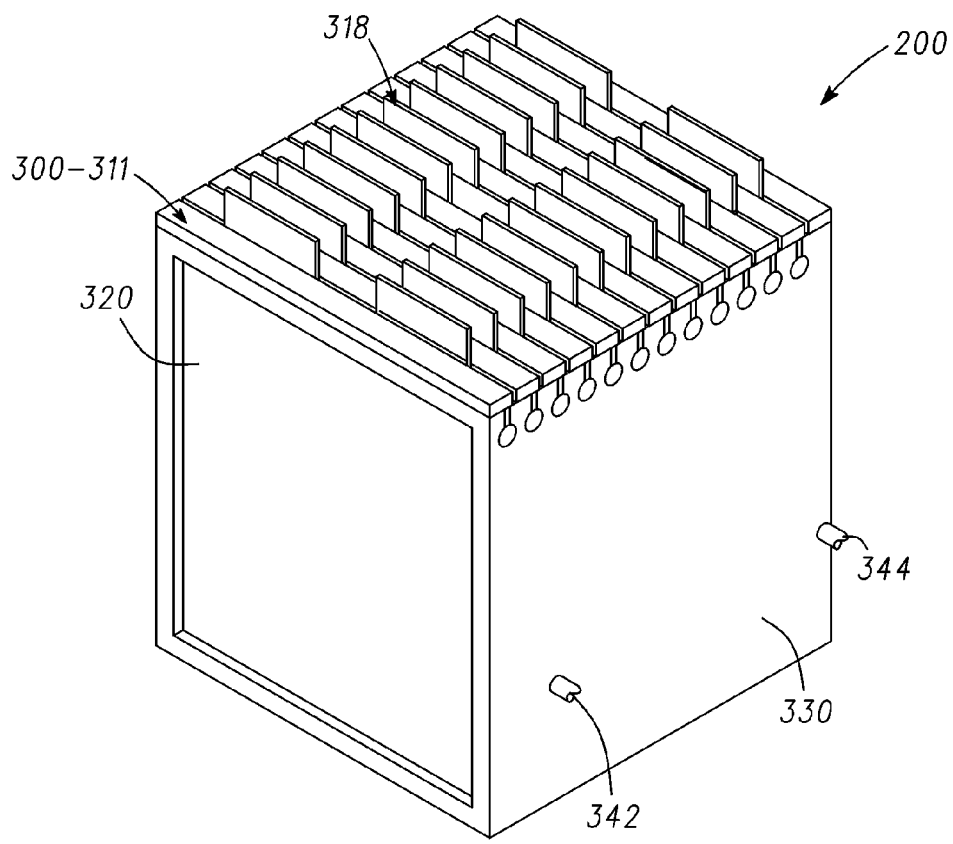
FIG. 3 is a partial, isometric view of a battery module for use in the battery assembly of FIG. 2 according to an exemplary embodiment.
Figure 4:
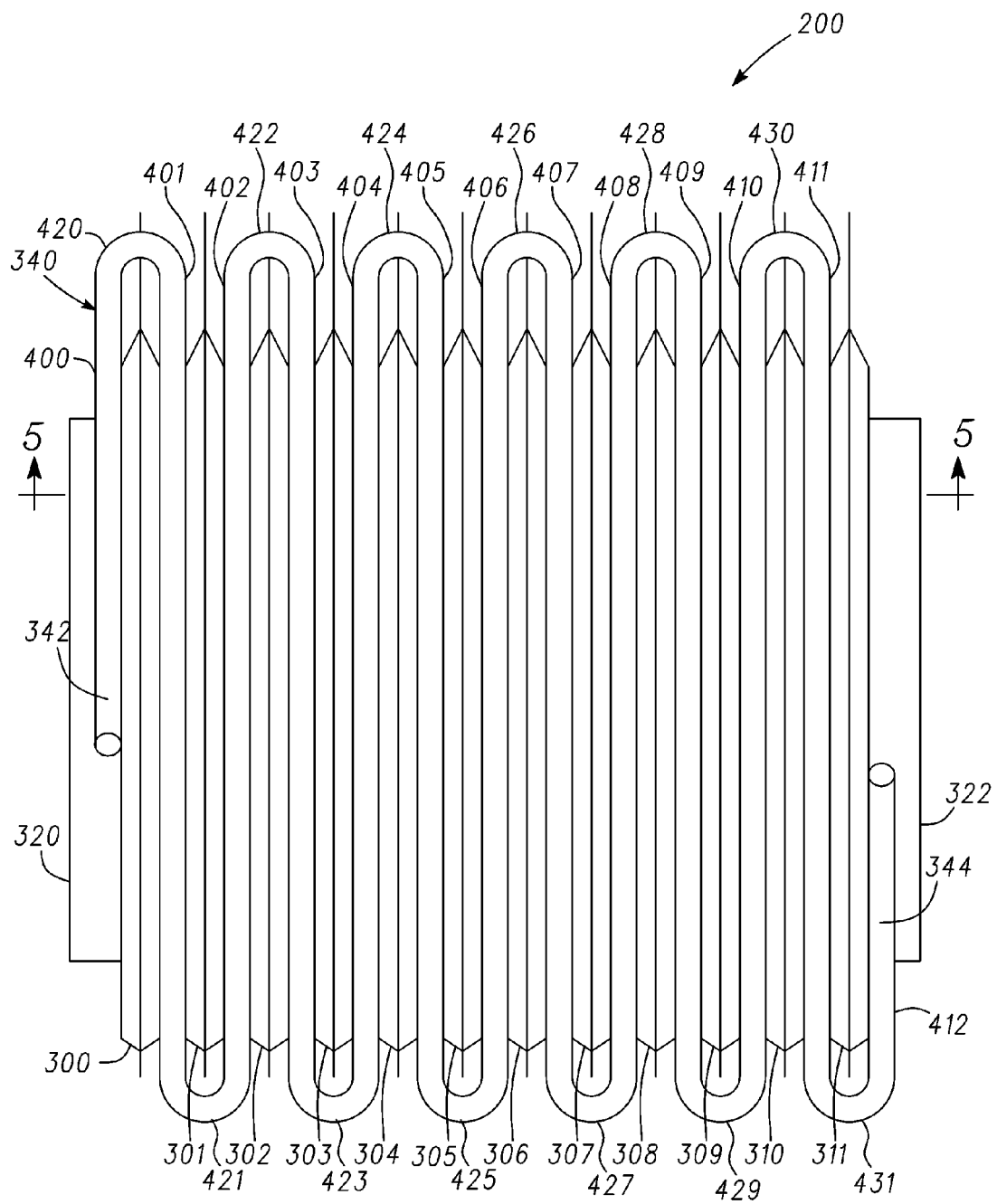
FIG. 4 is a partial side view of the battery module of FIG. 3.
Figure 5:
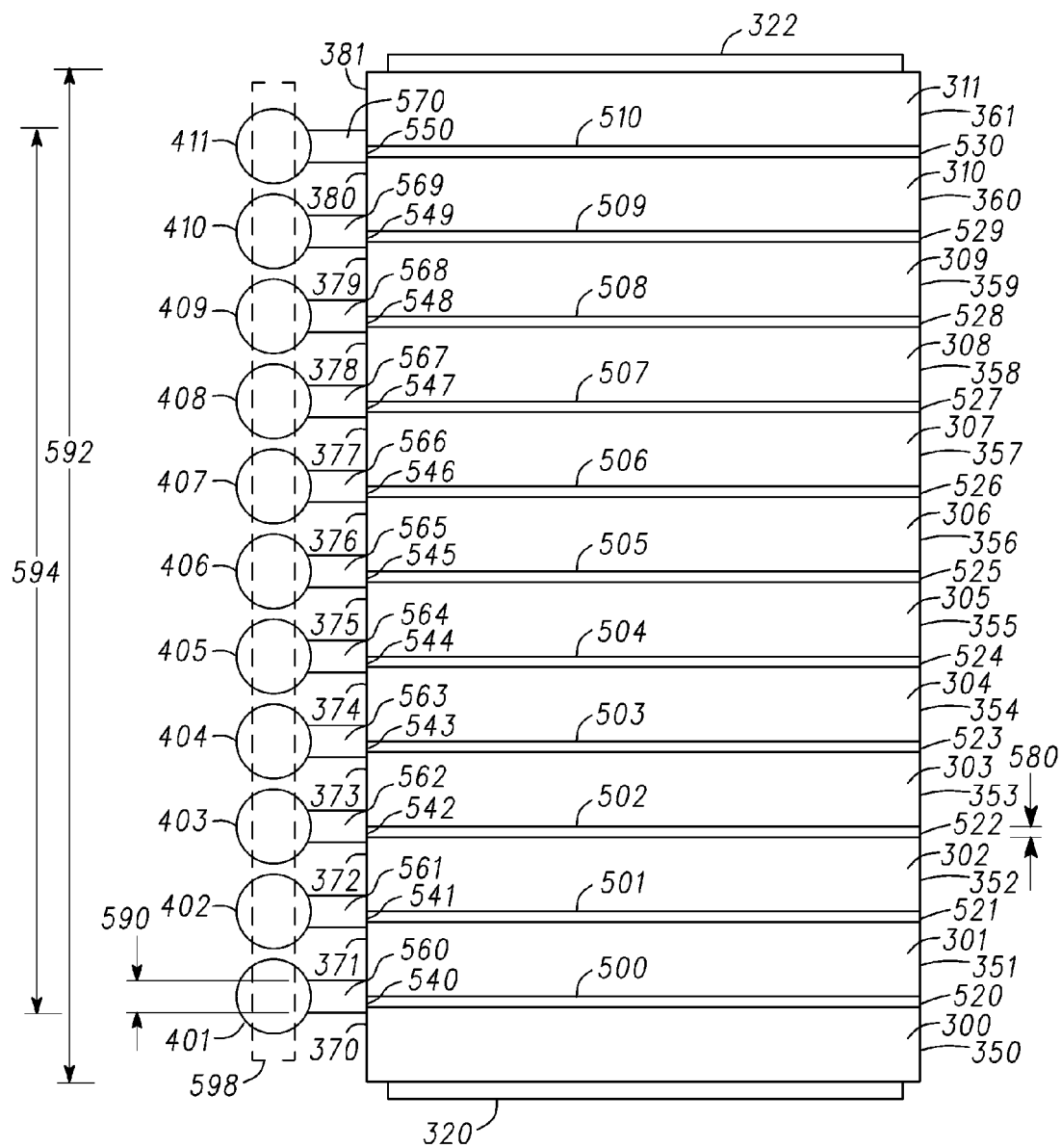
FIG. 5 is a cross-sectional view of the battery module of FIG. 4 along line 5-5.

FIGS. 3-5 are more detailed, interior views of a battery module 200, such as those incorporated into the battery assembly 122 discussed above. In particular, FIG. 3 is a partial, isometric view, FIG. 4 is a partial side view, and FIG. 5 is a cross-sectional view along line 5-5 of FIG. 4. As noted above, the battery modules 200 are combined to form a single, larger battery assembly 122.

Referring initially FIG. 3, the battery module 200 includes a stack of unit battery cells 300-311. In one embodiment, the battery cells 300-311 comprise prismatic lithium ion battery cells. In other embodiments, other types of battery cells may be employed. In any case, the battery cells 300-311 may have lengths, widths, and thicknesses that are substantially identical, although this configuration is not necessary. Each battery cell 300 may have terminals 318 to electrically couple the battery cells 300-311 together in either a series or parallel configuration. In the depicted embodiment, the battery cells 300-311 and the battery module 200 are generally rectangular.

A first end plate 320 is disposed adjacent one outermost battery cell 300-311 (e.g., battery cell 300) and a second end plate (not shown in FIG. 3) is disposed adjacent the opposite outermost battery cell 300-311 (e.g., battery cell 311). As such, the end plates 320 effectively book-end the battery cells 300-311 of the battery module 200.

A side plate 330 is disposed on one side of the stack of battery cells 300-311. As discussed in greater detail below, the side plate 330 may be thermally coupled to a fluid conduit that circulates coolant through the battery modules 200 to remove heat from the unit battery cells 300-311 as part of the fluid circuit 131 (FIG. 2). As shown in FIG. 3, the inlet 342 and outlet 344 extend through the side plate 330 and are configured to be coupled to the fluid circuit 131 (FIG. 2). The side plate 330 may be stamped or otherwise manufactured from any suitable material, such as aluminum, and may be provided with reinforcing ribs to improve bending strength.

FIG. 4 is a partial side view of the battery module 200 of FIG. 3. In FIG. 4, the side plate 330 (FIG. 3) has been removed to illustrate the arrangement of the fluid conduit 340 and the individual battery cells 300-311 between end plates 320 and 322. As noted above, the fluid conduit 340 extends between the inlet 342 and the outlet 344. In general, the fluid conduit 340 is arranged in a serpentine pattern with straight portions 400-412 extending along side edges of the battery cells 300-311 and bends 420-431 transitioning between the straight portions 400-412. The bends 420-431 may form 180° transitions between parallel straight portions 400-412. For example, bend 420 couples together straight portion 400 and straight portion 401. Although the bends 420-431 are generally 180° bends, any suitable bending arrangements and any desired number of bends may be provided.

The fluid conduit 340 may have the any suitable cross-sectional area and coolant flow rate, and these parameters may be modified based on cooling requirements. In general, the fluid conduit 340 may include magnesium, aluminum, plastics or other materials that do not degrade when exposed to the coolant and capable of thermally conducting heat.

Although twelve battery cells 300-311 are shown disposed within the battery module 200, a greater or fewer number of battery cells may be included in other embodiments. Moreover, although not shown, the battery assembly may include additional components, such as insulating materials, mechanical couplings and/or electrical control components.

FIG. 5 is a cross-sectional view of the battery module 200 of FIG. 4 along line 5-5. As noted above, the battery cells 300-311 are stacked together between end plates 320 and 322. The battery module 200 further includes a number of heat transfer plates 500-510 interposed between the battery cells 300-311. For example, the heat transfer plate 500 is sandwiched between the battery cell 300 and the battery cell 301. Cross-sections portions of the fluid conduit 340 are also shown in FIG. 5, which generally correspond to the straight portions 401-411 of the fluid conduit 340.

As noted above, the battery cells 300-311 are generally rectangular with a perimeter defined by four sides, such as the two sides 350-361 and 370-371 shown in FIG. 5. Each of the heat transfer plates 500-510 are generally the same size and shape as the battery cells 300-311 with a perimeter also defined by four sides, such as the two sides 520-530 and 540-550 shown in FIG. 5.

The battery module 200 further includes heat transfer fins 560-570 that thermally couple the heat transfer plates 500-510 to the straight portions 401-411 of the fluid conduit 340. For example, the heat transfer fin 560 thermally couples the heat transfer plate 500 to the straight portion 401 of the fluid conduit 340 with a suitable thermal interface material. Although FIG. 5 illustrates the heat transfer fins 560-570 thermally coupling the heat transfer plates 500-510 to the fluid conduit 340, in other embodiments, the fluid conduit 340 may be replaced with another type of heat sink, such as a cold plate.

The heat transfer fins 560-570 particularly extend from one of the sides 540-550 of the heat transfer plates 500-510. As shown in the cross-sectional view of FIG. 5, the thicknesses 580 of the heat transfer plates 500-510 are approximately equal to one another, and the thicknesses 590 of the heat transfer fins 560-570 are approximately equal to one another. The thickness 590 of each of the heat transfer fins 560-570 is greater than the thickness 580 of each of the heat transfer plates 500-510. In one exemplary embodiment, the thickness 590 of each of the heat transfer fins 560-570 is two times greater than the thickness 580 of each of the heat transfer plates 500-510, while in other embodiments, the thickness 590 of each of the heat transfer fins 560-570 is three or more times greater than the thickness 580 of each of the heat transfer plates 500-510. The increased thickness 590 of the heat transfer fins 560-570 provides improved heat transfer characteristics between the heat transfer plates 500-510 and the fluid conduit 340. For example, increasing the thicknesses 590 of the heat transfer fins 560-570 decreases the thermal resistance such that heat is more easily transferred, as discussed below.

In general, however, the increased thicknesses 590 of the heat transfer fins 560-570 do not increase the overall thickness of the battery module 200. In particular, the collective length 592 of the battery cells 300-311 and heat transfer plates 500-510 is still greater than the collective length 594 of the heat transfer fins 560-570. Similarly, the thickness 590 of each of the heat transfer fins 560-570 is less than half of the thickness of each battery cell 300-311.

During operation, the battery cells 300-311 generate heat, which is transferred to the heat transfer plates 500-510 interposed between the battery cells 300-311. Heat transfers from the heat transfer plates 500-510 to the heat transfer fins 560-570 extending from the sides 540-550 of the heat transfer plates 500-510. The heat transfer fins 560-570 are in contact with the straight portions 401-411 of the fluid conduits 340 such that the coolant flowing through the fluid conduit 340 removes the heat from the battery module 200. As noted above, coolant flowing in the fluid conduit 340 will flow through the fluid circuit 131 (FIG. 2) and the heat exchanger 126 (FIG. 2) to enable heat transfer to the ambient atmosphere or to be cooled via other mechanisms. Although exemplary embodiments are illustrated with the fluid conduit 340 and heat transfer fins 560-570 positioned on one side of the battery module 200, any suitable arrangement to remove a desired amount of heat may be provided, including additional heat transfer fins extending from the heat transfer plates 500-510 on the other side of the battery module 200. As also noted above, it may be desirable in some situations to heat the battery cells 300-311. In these situations, the working fluid (which corresponds to the coolant discussed above) flows through the fluid circuit 131 (FIG. 2) that may include a heater that heats the working fluid. As the working fluid flows through the fluid conduit 340, it transfers heat to the heat transfer fins 560-570 that subsequently is transferred to the heat transfer plates 500-510 and the battery cells 300-311.

As shown in FIG. 5 with dashed lines, in an alternate embodiment, the fluid conduits 340 may be incorporated into a cold plate 598 such that cools the coolant as it flows through the fluid conduits 340. In such an alternate embodiment, the cold plate 598 may replace the discrete or exterior fluid conduit 340 such as shown in FIG. 4 and additionally function as the side plate 330 such as shown in FIG. 3.

Figure 6:
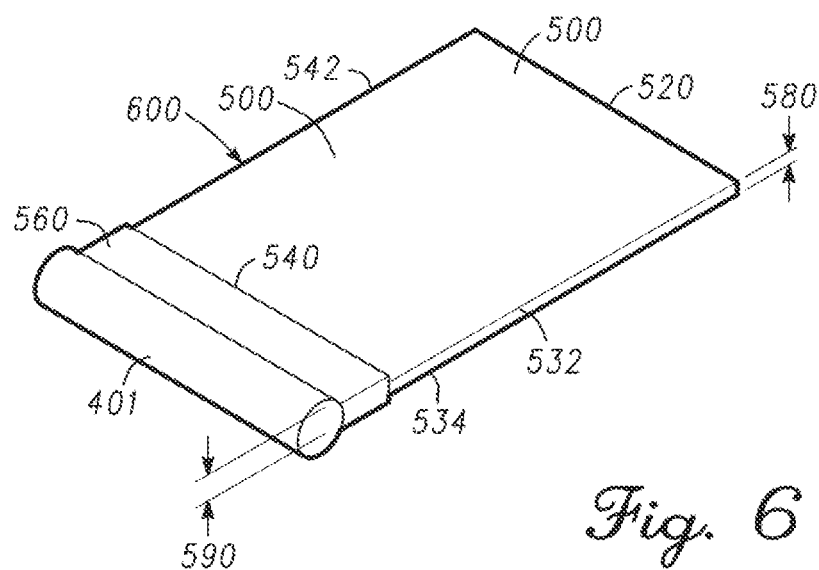
FIG. 6 is an isometric view of a heat transfer plate of the battery module of FIG. 3 in accordance with an exemplary embodiment.

FIG. 6 is an isometric view of an exemplary heat transfer plate, heat transfer fin, and fluid conduit portion, such as the heat transfer plate 500, the heat transfer fin 560, and fluid conduit portion 401 of the battery module 200 of FIG. 5 in accordance with an exemplary embodiment. As noted above, the thickness 590 of the heat transfer fin 560 is greater than the thickness 580 of the heat transfer plate 500 to provide enhanced thermal conductivity between the heat transfer plate 500 and the fluid conduit portion 401. In one exemplary embodiment, the heat transfer plate 500 is integral with the heat transfer fin 560. In other embodiments, the heat transfer plate 500 may be manufactured separately from the heat transfer fin 560 and coupled together in a manner that provides a high level of thermal conductivity. As such, the heat transfer plate 500 and heat transfer fin 560 may be manufactured from a common material, such as in a stamping, roll form, or swaging process. In general, the heat transfer plate 500 and heat transfer fin 560 may be any suitable material, such as copper or aluminum.

FIG. 6 also more clearly shows the perimeter 600 of the heat transfer plate 500 defined by four sides 520, 532, 540, and 542, an upper face 544, and a lower face 534. As shown in FIG. 5 and discussed above, the perimeter 600 of the heat transfer plate 500 typically matches the perimeters of the adjacent battery cells 300 and 301 such that the upper face 544 fully engages the battery cell 301 and the lower face 534 fully engages the battery cell 300 to provide good thermal contact. In general, the heat transfer plate 500 and heat transfer fin 560 are parallel to one another, i.e., such that the heat transfer fin 560 provides a direct thermal path to the fluid conduit portion 401, although other arrangements may be provided.

Figure 7:
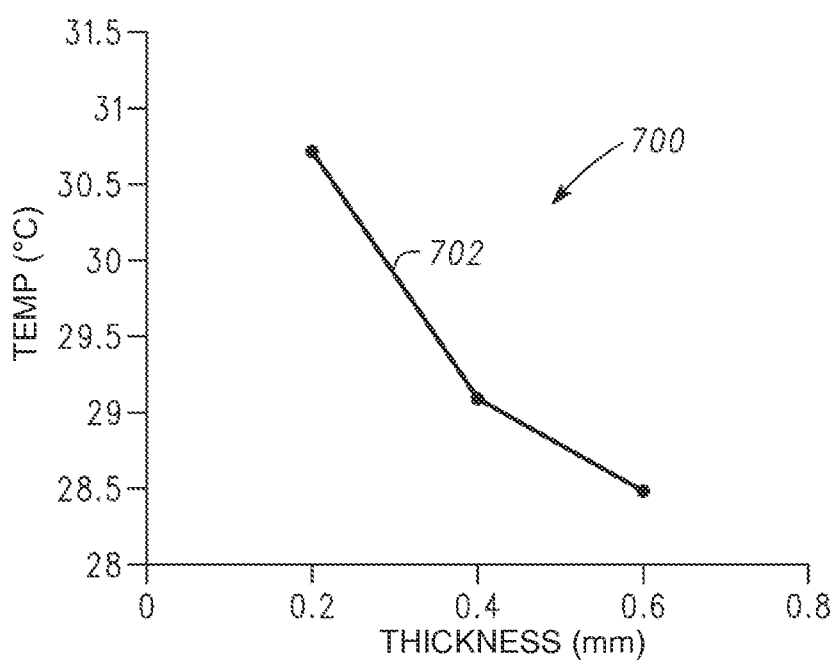
FIG. 7 is a graph illustrating an exemplary relationship between the temperature of a battery module and a thickness of a heat transfer fin in accordance with an exemplary embodiment.

FIG. 7 is a graph 700 illustrating an exemplary relationship between the temperature of a battery module, such as battery module 200 of FIGS. 3-6, and a thickness of a heat transfer fin, such as heat transfer fins 560-570 of FIG. 6, in accordance with an exemplary embodiment. In the graph 700 of FIG. 7, the x-axis corresponds to exemplary thicknesses (mm) of the heat transfer fin, such as heat transfer fins 560-570 (FIG. 5), and the y-axis corresponds to resulting temperatures (° C.) of the battery cells, such as battery cells 300-311 (FIGS. 3-5). In this exemplary embodiment, the heat transfer plates had a thickness of 0.2 mm. As indicated by line 702, when the heat transfer fin is also 0.2 mm, the temperature is approximately 30.6° C. As the thickness increases to 0.4 mm and 0.6 mm (i.e., two and three times the heat transfer plate thickness), the temperature drops to about 29° C. and to about 28.4° C., respectively. As such, the increase in thickness of the heat transfer fin relative to the heat transfer plate provides improved temperature characteristics.

In particular, the increased thickness of the heat transfer fin decreases the thermal resistance of the heat transfer fin, and removes any bottleneck in the thermal path from the battery cell to the fluid conduit to provide a desired thermal gradient throughout the path. In one exemplary embodiment, the thermal resistance of the heat transfer fin is approximately equal to the thermal resistance of the associated heat transfer plate. As such, the battery assembly 122 may exhibit improved cooling characteristics as compared to conventional battery assemblies without increasing the overall size and complexity of the battery module 200. Thus, temperature regulation, as well as battery performance, may be improved.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. A battery module, comprising:
   a first battery cell;
   a heat transfer plate contacting the first battery cell and defining a perimeter, the heat transfer plate having a first thickness;
   a heat transfer fin extending from the perimeter of the heat transfer plate, the heat transfer fin having a second thickness that is greater than the first thickness; and
   a fluid conduit coupled to the heat transfer fin, whereby, during operation, heat is transferred from the first battery cell, to the heat transfer plate, to the heat transfer fin, and to the fluid conduit.

2. The battery module of claim 1, wherein the heat transfer plate and the heat transfer fin are integral with one another.

3. The battery module of claim 1, further comprising a second battery cell positioned such that the heat transfer plate is sandwiched between the first battery cell and the second battery cell.

4. The battery module of claim 3, wherein the heat transfer plate has a first face engaging the second battery cell and a second face opposite to the first face engaging the first battery cell, the first face and the second face being within the perimeter.

5. The battery module of claim 4, wherein the first battery cell and the second battery cell each have a perimeter that is approximately aligned with the perimeter of the heat transfer plate.

6. The battery module of claim 1, wherein the heat transfer plate and the eat transfer fin are parallel to one another.

7. The battery module of claim 1, wherein the heat transfer plate has a first thermal resistance and the heat transfer fin has a second thermal resistance, and wherein, during operation, the first thermal resistance is approximately equal to the second thermal resistance.

8. The battery module of claim 1, wherein the perimeter of the heat transfer plate is defined by a plurality of side edges, and wherein the heat transfer fin extends from one of the plurality of side edges, wherein the first thickness of the heat transfer plate is continuously constant within the perimeter of the heat transfer plate.

9. The battery module of claim 1, wherein the heat transfer plate is a first heat transfer plate and the heat transfer fin is a first heat transfer fin, and wherein the battery module further comprises
   a third battery cell,
   a second heat transfer plate sandwiched between the second battery cell and the third battery cell, the second heat transfer plate defining a second perimeter with edges having a third thickness approximately equal to the first thickness, and
   a second heat transfer fin extending from one of the edges of the second heat transfer plate and thermally coupling the second heat transfer plate to the fluid conduit.

10. The battery module of claim 9, wherein the fluid conduit has a serpentine arrangement with a first straight portion extending along the first heat transfer fin and a second straight portion extending along the second heat transfer fin, the fluid conduit further including a bend coupling the first straight portion to the second straight portion.

11. The battery module of claim 9, wherein the second heat transfer fin has a fourth thickness, the fourth thickness being greater than the third thickness.

12. The battery module of claim 11, wherein the second thickness is approximately equal to the fourth thickness, and wherein the second thickness is at least three times greater than the first thickness.

13. A battery module, comprising:
a plurality of stacked battery cells;
a plurality of heat transfer plates, each interposed between and contacting adjacent battery cells of the plurality of stacked battery cells and defined by at least a first side, each of the plurality of heat transfer plates has a first thickness;
a plurality of heat transfer fins, each extending from the perimeter of one of the plurality of heat transfer plates, each of the plurality of heat transfer fins having a second thickness greater than the first thickness; and
a heat sink coupled to each of the plurality of heat transfer fins.

14. The battery module of claim 13, wherein the plurality of heat transfer plates and the plurality of stacked battery cells have a first collective length and the plurality of heat transfer fins has a second collective length that is less than the first collective length.

15. The battery module of claim 13, wherein the heat sink is a fluid conduit.

16. The battery module of claim 13, wherein each of the plurality of heat transfer fins is integral with the one of the plurality of heat transfer plates.

17. The battery module of claim 13, wherein each of the plurality of heat transfer fins is parallel to the one of the plurality of heat transfer plates.

18. The battery module of claim 13, wherein the plurality of heat transfer fins has a first thermal resistance and the plurality of heat transfer plates has a second thermal resistance approximately equal to the first thermal resistance.

19. The battery module of claim 13, wherein each of the plurality of battery cells has a first perimeter and each of the plurality of heat transfer plates has a second perimeter, and wherein the first perimeter is approximately aligned with the second perimeter.

20. A battery module, comprising:
a first battery cell;
a first heat transfer plate contacting the first battery cell and having a first thickness;
a second battery cell contacting the heat transfer plate;
a second heat transfer plate contacting the second battery cell and having a second thickness approximately equal to the first thickness;
a third battery cell contacting the second heat transfer plate;
a first heat transfer fin extending from the perimeter of the first heat transfer plate and integral with the first heat transfer plate, the first heat transfer fin having a third thickness greater than the first thickness;
a second heat fin extending from the perimeter of the second heat transfer plate and integral with the second heat transfer plate, the second heat transfer fin having a fourth thickness approximately equal to the third thickness; and
a fluid conduit coupled to the first heat transfer fin and the second heat transfer fin.

* * * * *